(12) United States Patent
Karpel Vel Leitner et al.

(10) Patent No.: US 8,101,088 B2
(45) Date of Patent: Jan. 24, 2012

(54) METHOD FOR DEPOLLUTING AQUEOUS MEDIA CONTAINING ORGANIC POLLUTANTS

(75) Inventors: Nathalie Karpel Vel Leitner, Vouneuil sur Vienne (FR); Carole Catastini, Poitiers (FR)

(73) Assignees: Centre National de la Recherche Scientifique, Paris (FR); Universite de Poitiers, Poitiers (FR)

( * ) Notice: Subject to any disclaimer, the term of this patent is extended or adjusted under 35 U.S.C. 154(b) by 511 days.

(21) Appl. No.: 11/988,567

(22) PCT Filed: Jul. 11, 2006

(86) PCT No.: PCT/FR2006/001685
§ 371 (c)(1),
(2), (4) Date: Jun. 1, 2009

(87) PCT Pub. No.: WO2007/006968
PCT Pub. Date: Jan. 18, 2007

(65) Prior Publication Data
US 2009/0294376 A1 Dec. 3, 2009

(30) Foreign Application Priority Data
Jul. 12, 2005 (FR) .................................... 05 07456

(51) Int. Cl.
*C02F 1/30* (2006.01)
*C02F 1/72* (2006.01)
(52) U.S. Cl. .................. 210/721; 210/724; 210/748.17; 210/763; 210/908; 210/909
(58) Field of Classification Search ................... 210/702
See application file for complete search history.

(56) References Cited

U.S. PATENT DOCUMENTS

| | | | |
|---|---|---|---|
| 5,457,269 A | | 10/1995 | Schonberg |
| 5,762,808 A | * | 6/1998 | Peyton ..................... 210/748.04 |
| 5,807,491 A | * | 9/1998 | Materi ..................... 210/748.01 |
| 6,474,908 B1 | * | 11/2002 | Hoag et al. ................. 405/128.5 |

FOREIGN PATENT DOCUMENTS

| | | |
|---|---|---|
| DE | 38 36 850 A1 | 5/1990 |
| EP | 0 824 504 B1 | 7/1999 |

OTHER PUBLICATIONS

International Search Report dated Jul. 24, 2007, 2 pages.

* cited by examiner

*Primary Examiner* — Peter A Hruskoci
(74) *Attorney, Agent, or Firm* — Merchant & Gould

(57) ABSTRACT

The present invention relates to a process for decontaminating aqueous media comprising organic contaminants.
The process is targeted at reducing the COD and/or the TOC of an aqueous medium comprising organic molecules. It consists in subjecting the aqueous medium to an electron beam generated by an electron accelerator in the presence of a catalyst and in then removing the precipitates formed from the treated solution, said catalyst comprising a metal ion persulfate and optionally an Fe(II) salt or an Fe(III) salt.

8 Claims, 2 Drawing Sheets

METHOD FOR DEPOLLUTING AQUEOUS MEDIA CONTAINING ORGANIC POLLUTANTS

The present invention relates to a process for decontaminating aqueous media comprising organic contaminants.

BACKGROUND OF THE INVENTION

It is known to use electron beams for the treatment of aqueous effluents comprising organic contaminants. The decomposition of the contaminants originates from the action of reactive entities formed when the electrons penetrate the water, said reactive entities being OH°, H° or $e^-_{aq}$. A treatment comprising solely a treatment with an electron beam makes it possible to reduce the level of certain contaminants, indeed even to completely eliminate said contaminant, provided that the energy applied is sufficient in view of the contaminant concerned. However, this energy is insufficient in the majority of cases.

The basic principle of an accelerator generating an electron beam is the transfer of energy (generally of 0.5 to 10 MeV) to charged particles under the effect of an electric field created by an electrical voltage. An electron accelerator thus comprises:
- a source of electrons (heated metal cathode),
- one or more sources of high voltage (a series of electrodes brought to appropriate potentials),
- a high-vacuum accelerating tube,
- a system for focusing and then sweeping the beam for homogeneous emission,
- a window (thin titanium sheet) which provides leak-tightness while allowing the accelerated electrons to pass.

Improvements have been proposed in order to broaden the process for treatment by an electron beam to varied contaminants and/or to obtain better levels of decomposition, the improvements generally consisting in adding additives to the medium to be treated or in combining the treatment by an electron beam with another treatment.

The proposal has been made to carry out the treatment by irradiation in the presence of ozone in the reaction medium, in particular for the treatment of natural water comprising halogenated aromatic hydrocarbons, of natural water comprising halogenated alkanes and alkenes, and drinking water comprising halogenated alkanes and alkenes [Gehringer P. et al., *Environmental Applications of Ionizing Radiation*, edited by Cooper W. J., Curry R. D. and O'Shea K. E., Wiley and Sons Pub., (1988) pp. 325-340]; for the treatment of river water having a COD [Pikaev A. K. et al., *Radiation Physics and Chemistry*, (1996) 48, 75-80]; for the treatment of waste water having a COD [Pikaev et al., *High Energy Chemistry*, (2000b) 34, 55-73].

The addition of $O_3/O_2$ during an irradiation treatment has been employed for the treatment of synthetic water comprising halogenated aromatic hydrocarbons [Getoff, *Radiation Physics and Chemistry*, (2002) 65, 437-446].

The addition of active charcoal during an irradiation treatment has been described for the treatment of synthetic water comprising halogenated aromatic hydrocarbons [Dickson et al., Rapport de Atomic Energy of Canada Ltd., Pinawa MB Canada (1988) AECL 9558, 46p].

The addition of $O_3$, $H_2O_2$, $O_2$ and $N_2O$ has been employed for the treatment of natural water comprising halogenated alkanes or alkenes [Pikaev A. K., *High Energy Chemistry*, (2000a) 34, 1-12], [Pikaev A. K., *Radiation Physics and Chemistry*, (2002) 65, 515-526] and [Gehringer et al., *Radiation Physics and Chemistry*, (2002) 65, 379-386].

The addition of $TiO_2$ has been applied to the treatment of synthetic water comprising aromatic compounds [Chitose N. et al., *Chemosphere*, (2003) 50, 1007-1013].

The combination with a biological treatment has been employed for the treatment of the Total Organic Carbon (TOC) of waste water and of waste water comprising BOD (biochemical oxygen demand) [Han et al., *Radiation Physics and Chemistry*, (2002) 64, 53-59].

The combination with a coagulation has been described for the treatment of industrial effluents comprising a COD (chemical oxygen demand) and of industrial effluents comprising a colorant [Pikaev A. K., *High Energy Chemistry*, (2000b) 34, 55-73].

The combination with a coagulation, a flocculation and a biological treatment has been described for the treatment of industrial effluents comprising a COD and of industrial effluents comprising a colorant [Shin et al., *Radiation Physics and Chemistry*, (2002) 65, 539-547].

A process which combines an adsorption on a plant material with an irradiation has been described for the treatment of spring water comprising metals [Pikaev, 2000b, mentioned above].

A process in which an Fe(II) salt is added to the effluent subjected to an irradiation is described for the removal of organic dye molecules present in dyeing effluents [C. N. Kurucz et al., J. Adv. Oxid. Technol., Vol. 3, No. 1, 1998, pp. 116-123].

The majority of these processes of the prior art, which combine a treatment by an electron beam and an additional treatment, have improved performances in reducing the content of contaminant. However, they exhibit several disadvantages. Some combinations involve expensive reactants or else their use may be problematic (in particular when there is transfer of ozone or the need to recover solid catalysts). The combination with other treatment processes is cumbersome and often results in a significant expense. Finally, the improvement is not always sufficient.

SUMMARY OF THE INVENTION

The aim of the present invention is to propose a simple process which gives improved results, in comparison with those of the techniques of the prior art.

The process is intended for the treatment of industrial effluents, which generally comprise several types of contaminating molecules, the individual nature and the individual content of which are not accurately known. Due to lack of ability to be characterized by the content and the nature of the various contaminating molecules, an effluent may be usefully characterized by the COD (chemical oxygen demand) and by the TOC (total organic carbon).

The process of the present invention is a process targeted at reducing the COD and/or the TOC of an aqueous medium comprising organic molecules, characterized in that it consists in subjecting said aqueous medium to an electron beam generated by an electron accelerator in the presence of a catalyst and in then removing the precipitates formed from the treated solution, said catalyst comprising a metal ion persulfate.

BRIEF DESCRIPTION OF THE DRAWINGS

FIG. 1 relates to the catalyst-free aqueous solution of comparative example 1c.

FIG. 2 relates to the aqueous solution with catalyst (Fe(III) salt and persulfate) of example 4.

FIG. 3 relates to the treatment of the aqueous solutions of examples 5 (curve represented by squares), 5a (curve represented by diamonds) and 5b (curve represented by triangles). The residual content of phenol (P in µM) is shown on the ordinate and the irradiation dose in Gy is shown on the abscissa.

DETAILED DESCRIPTION OF THE PREFERRED EMBODIMENTS

Figure 1:
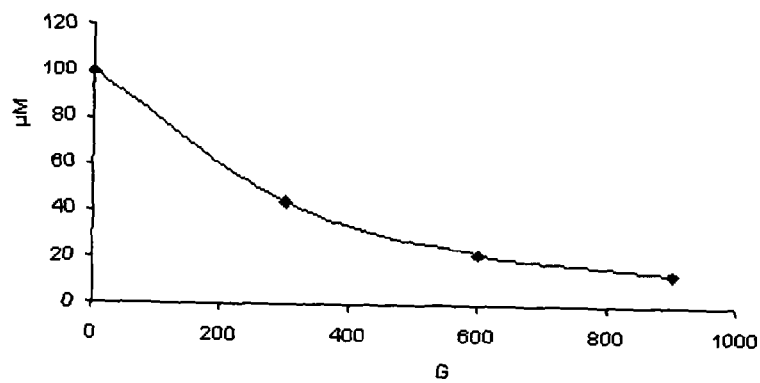
FIGS. 1 to 3 represent the change in the level of phenol in aqueous solution (on the ordinate, in μM), as a function of the irradiation dose (Gy on the abscissa).

In a specific embodiment, the catalyst is composed solely of a persulfate.

In another embodiment, the catalyst comprises an Fe(II) salt or an Fe(III) salt, and a persulfate.

The persulfate can be chosen from alkali metal, alkaline earth metal or transition metal persulfates. Alkali metal persulfates are preferred, in particular sodium persulfate.

The iron salt is preferably chosen from the salts in which the anion does not constitute a competitor in radical reactions, in particular iron perchlorate and iron persulfate.

When the catalyst is composed of a mixture of iron salt and of persulfate, it is preferable, on the one hand, to use a concentration of ferric salt or of ferrous salt which is lower than that of the persulfate and, on the other hand, to bring the medium to be treated to an acidic pH in order to prevent the precipitation of the iron hydroxides which are formed before or during the treatment by an electron beam.

The process proposed is of use in reducing the COD of waste water and in the treatment of aqueous media comprising organic molecules of the aromatic type and/or organic molecules of the aliphatic type. Mention may be made, as examples of organic molecules of the aromatic type, of phenol and nitrophenol. Mention may be made, as examples of molecules of the aliphatic type, of carboxylic acids.

The amount of catalyst depends on the organic charge (evaluated in terms of TOC and/or of COD). It must in addition be adjusted according to the irradiation dose. The determination of the optimum amounts for each individual case is within the scope of a person skilled in the art, by carrying out a series of tests by successive approximations.

For very high organic charges, it is preferable to subject the effluent to a preliminary treatment targeted at reducing the organic charge which is easily oxidizable, for the purpose of facilitating the oxidation of the least oxidizable organic molecules by the proposed process. The preliminary treatment can be a catalyst-free irradiation.

A treatment by an electron beam carried out conventionally in the absence of catalyst generates reactive entities which are formed when electrons penetrate the water, said reactive entities being $OH°$, $H°$ or $e^-_{aq}$. The $OH°$ radicals and the solvated electrons can respectively induce oxidation and reduction reactions, which makes it possible to act on a large range of compounds.

When the treatment by an electron beam is carried out in the presence of persulfate, sulfate radicals are additionally formed, which radicals are capable of oxidizing compounds on which the reactive entities $OH°$, $H°$ or $e^-_{aq}$ have little effect. The use of persulfate consequently makes it possible to enhance the performance of the process for treatment with an ion beam, in the sense that it makes it possible to destroy a greater variety of contaminating organic compounds and/or that it reduces the level of residual contaminant with a lower degree of irradiation. The addition of an iron salt improves the performance.

The present invention is described in more detail with the help of the following examples, which are intended only to illustrate the invention but to which the scope of the invention is not limited.

EXAMPLE 1

Various tests were carried out on an aqueous phenol solution (100 µM of phenol/l), which has a pH of 3.

The solution was subjected to various doses of irradiation while varying the residence time under the electron beam, and the nature of the catalyst and/or the content of catalyst were/was modified. Each sample was subsequently analyzed by HPLC in order to determine the variation in concentration of the contaminant.

The tests denoted 1c and 2c are comparative tests in which the phenol solution does not comprise catalyst (1c) or comprises a $TiO_2$ catalyst (2c).

For the tests according to the invention (3 to 9), the phenol solution additionally comprises the catalyst according to the invention.

Figure 2:
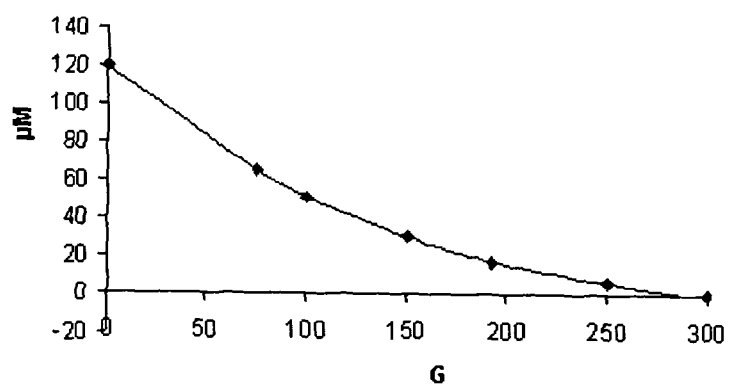
Figure 3:
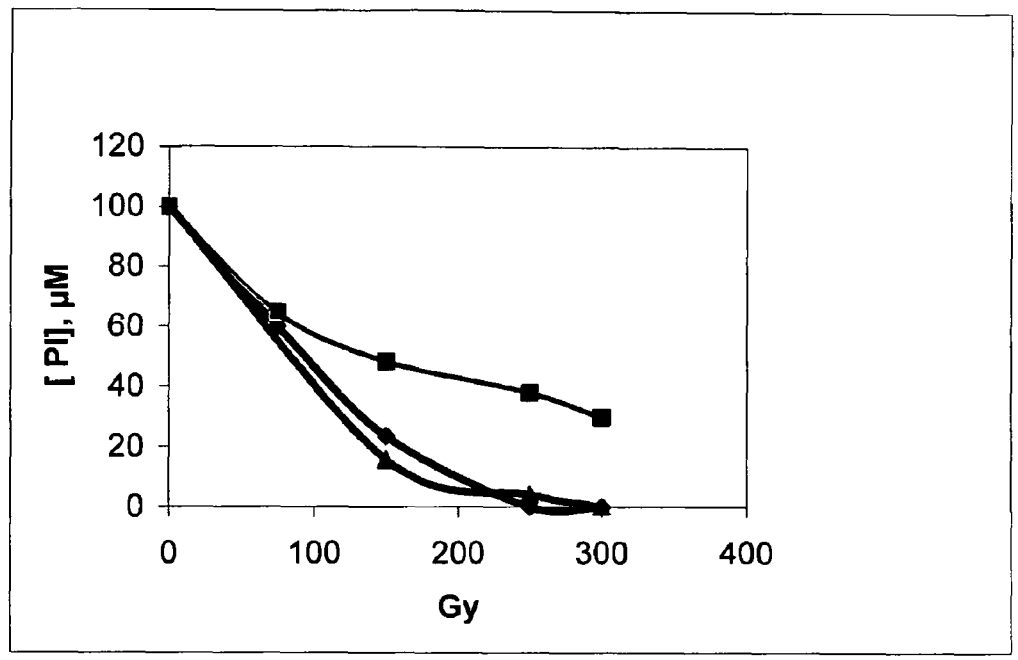

FIGS. 1 to 3 represent the change in the level of phenol in aqueous solution (on the ordinate, in µM), as a function of the irradiation dose (Gy on the abscissa).

FIG. 1 relates to the catalyst-free aqueous solution of comparative example 1c.

FIG. 2 relates to the aqueous solution with catalyst (Fe(III) salt and persulfate) of ex. 4.

FIG. 3 relates to the treatment of the aqueous solutions of examples 5 (curve represented by squares), 5a (curve represented by diamonds) and 5b (curve represented by triangles). The residual content of phenol (P in µM) is shown on the ordinate and the irradiation dose in Gy is shown on the abscissa.

The combined results are given in the following table I.

TABLE I

| Ex. | Iron(II) or (III) salt sulfate (s) or perchlorate (p) | Sodium persulfate | Residual level of organic molecule | Irradiation dose (Gy) |
|---|---|---|---|---|
| 1c | — | — | 15% | 900 |
|  |  |  | 46% | 320 |
| 2c |  |  | 7.2% | 900 |
|  |  |  | 27.5% | 300 |
| 3 |  | 3000 µM | 5% | 900 |
|  |  |  | 21% | 300 |
| 4 | Fe(III) 200 µM (s) | 3000 µM | 0% | 300 |
|  |  |  | 26% | 150 |
| 5 |  | 1000 µM | 30% | 300 |
|  |  |  | 48% | 150 |
| 5a | Fe(III) 200 µM (p) | 1000 µM | 0% | 300 |
|  |  |  | 24% | 150 |
| 6 |  | 500 µM | 34% | 300 |
|  |  |  | 56% | 150 |
| 6a | Fe(III) 300 µM (p) | 500 µM | 5% | 300 |
|  |  |  | 30% | 150 |
| 6b | Fe(III) 200 µM (s) | 500 µM | 16% | 300 |
|  |  |  | 35% | 150 |
| 6c | Fe(II) 100 µM (p) | 500 µM | 8% | 300 |
|  |  |  | 30% | 150 |
| 6d | Fe(II) 200 µM (p) | 500 µM | 30% | 150 |
| 7 | Fe(II) 200 µM (p) | 300 µM | 45% | 150 |

TABLE I-continued

| Ex. | Iron(II) or (III) salt sulfate (s) or perchlorate (p) | Sodium persulfate | Residual level of organic molecule | Irradiation dose (Gy) |
|---|---|---|---|---|
| 8 | Fe(III) 200 µM (p) | 200 µM | 27% | 300 |
|   |                    |         | 44% | 150 |
| 8a | Fe(II) 200 µM (p) | 200 µM | 50% | 150 |
| 9 | Fe(III) 200 µM (p) | 100 µM | 39% | 300 |
|   |                    |         | 56% | 150 |

The comparison of the performances obtained with the comparative examples and those obtained with the examples according to the invention shows an improvement in all cases. In the presence of a catalyst, the residual level decreases for an analogous irradiation dose and a given residual level can be obtained with a lower irradiation dose.

The comparison of tests 3 and 4 shows that the addition of iron sulfate to a medium comprising sodium persulfate makes it possible to substantially reduce the degree of irradiation in order to obtain a similar, indeed even better, result.

The comparison of examples 4, 5a, 6b, 8 and 9 shows that, in the presence of 200 µM of Fe(III) salt, a content of 1000 µM is an upper limit beyond which the performance is no longer improved, for an effluent comprising 100 µM of phenol.

It is thus apparent that, for a given catalyst, there exists a catalyst concentration range within which the performance is optimum, limited by an upper value which it is pointless to exceed. The determination of this range is within the scope of a person skilled in the art, for whom it is sufficient to carry out a few preliminary tests by modifying the conditions, for a given effluent to be treated.

EXAMPLE 2

Tests were carried out on an aqueous nitrophenol solution (100 µM/l), under the conditions described in example 1.

The solution was subjected to various doses of irradiation while varying the residence time under the electron beam, and the nature of the catalyst and/or the content of catalyst were/was modified. Each sample was subsequently analyzed by HPLC in order to determine the variation in concentration of the contaminant.

Figure 4:
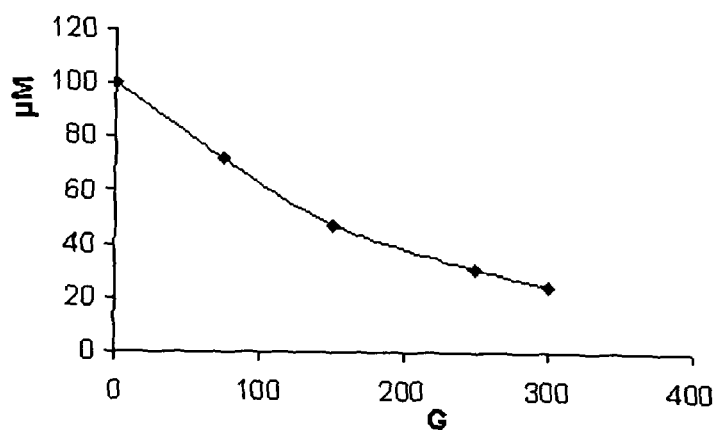
FIGS. 4 and 5 represent the change in the level of nitrophenol in aqueous solution (on the ordinate, in µM), as a function of the irradiation dose (in Gy, on the abscissa), respectively for example 10 and for comparative example 10c.
Figure 5:
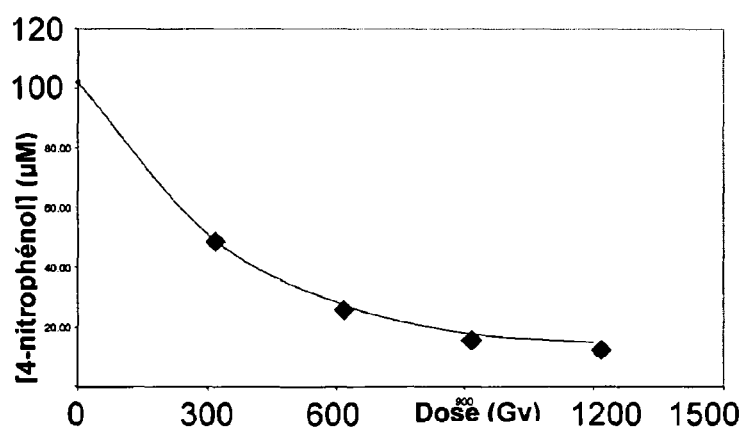

FIGS. 4 and 5 represent the change in the level of nitrophenol in aqueous solution (on the ordinate, in µM), as a function of the irradiation dose (in Gy, on the abscissa), respectively for ex. 10 and for comparative example 10c.

The results are given in table II.

TABLE II

| Ex. | Iron(II) sulfate | Sodium persulfate | Residual level of organic molecule | Irradiation dose (Gy) |
|---|---|---|---|---|
| 10 | 200 µM | 1000 µM | 25% | 300 |
|    |        |          | 47% | 150 |
| 10c | — | — | 20% | 900 |
|     |   |   | 50% | 300 |

EXAMPLE 3

Tests were carried out on a 400 µM/l aqueous phenol solution under the conditions described in example 1.

The solution was subjected to various doses of irradiation while varying the residence time under the electron beam, and the nature of the catalyst and/or the content of catalyst were/was modified. Each sample was subsequently analyzed by HPLC in order to determine the variation in concentration of the contaminant.

The results are given in table III.

TABLE III

| Iron(II) or (III) | Sodium persulfate | Residual level of phenol | Irradiation dose (Gy) |
|---|---|---|---|
| — | — | 51% | 900 |
|   |   | 81% | 300 |
| — | 1000 µM | 77% | 250 |
|   |         | 83% | 150 |

The comparison of 11c and 11 confirms that the addition of sodium persulfate makes it possible to reduce the irradiation dose while obtaining an analogous, indeed even lower, residual level.

EXAMPLE 4

Tests were carried out on three aqueous carboxylic acid solutions (200 µM/l) under the conditions of example 1.

The results are given in table IV. Tests 12c, 13c and 14c, without catalyst, are given by way of comparison. Tests 12, 13 and 14 show that the addition of a catalyst according to the invention makes it possible to reduce the residual level at the same irradiation dose. For tests 12 and 12c, carried out on the formic acid solution, the residual level of contaminant represents the residual level of the TOC.

TABLE IV

| Ex. | Contaminant (100 µM) | Iron(III) perchlorate | Sodium persulfate | Residual level of contaminant (%) | Irradiation dose (Gy) |
|---|---|---|---|---|---|
| 12c | Formic acid | 0 | 0 | 84 | 150 |
|     |             |   |   | 91 | 75 |
| 12  | Formic acid | 200 µM | 1000 µM | 69 | 150 |
|     |             |         |          | 80 | 75 |
| 13c | Glycolic acid | 0 | 0 | 89 | 150 |
| 13  | Glycolic acid | 200 µM | 1000 µM | 43 | 150 |
| 14c | Fumaric acid | 0 | 0 | 30.5 | 600 |
|     |              |   |   | 61 | 300 |
|     |              |   |   | 79.3 | 150 |
| 14  | Fumaric acid | 200 µM | 1000 µM | 18.2 | 600 |
|     |              |         |          | 39.8 | 300 |
|     |              |         |          | 57.3 | 150 |

EXAMPLE 5

Tests were carried out on a lagoon water having a COD of 160 mg $O_2$/l.

The effluent was subjected first to an irradiation dose of 3375 Gy. This treatment resulted in a residual COD of 115 mg $O_2$/l. The solution thus obtained was then subjected to a second irradiation dose at 3375 Gy under the various conditions mentioned below:

Test 15: Catalyst-free solution
Test 16: Solution to which 1000 µM of sodium persulfate have been added
Test 17: Solution to which 1000 µM of sodium persulfate and 600 µM of iron(III) chloride have been added.

The residual COD level, with respect to the COD of the starting effluent (COD=160 mg $O_2$/l), for the various tests is presented in table V.

TABLE V

| Ex. | Iron(III) salt | Sodium persulfate | Residual COD level (%) | Irradiation dose (Gy) during the $2^{nd}$ treatment |
|---|---|---|---|---|
| 15 | — | — | 71% | 3375 |
| 16 | — | 1000 µM | 58% | 3375 |
| 17 | 600 µM | 1000 µM | 31% | 3375 |

The results obtained show an improvement in the performance in the presence of a catalyst. The comparison of tests 16 and 17 shows that the addition of the iron(III) salt to a water comprising sodium persulfate makes it possible to reduce the residual COD level.

EXAMPLE 6

Tests were carried out on a waste water having a TOC (total organic carbon) of 80 mg C/l resulting from the chemical industry.

The effluent was subjected first to an irradiation dose of 13000 Gy. This treatment resulted in a residual TOC of 66 mg C/l. The solution thus obtained was then subjected to a second irradiation dose at 7000 Gy under the various conditions mentioned below:

Test 18: Catalyst-free solution
Test 19: Solution to which 1000 µM of sodium persulfate and 600 µm of iron(III) chloride have been added.

The residual TOC level, with respect to the TOC of the starting effluent (TOC=80 mg C/l), is presented in table VI.

TABLE VI

| Ex. | Iron(III) salt | Sodium persulfate | Residual TOC level (%) | Irradiation dose (Gy) during the $2^{nd}$ treatment |
|---|---|---|---|---|
| 18 | — | — | 72% | 7000 |
| 19 | 600 µM | 1000 µM | 42% | 7000 |

The results obtained show that the addition of a catalyst makes it possible to improve the performance with regard to the residual TOC level in the case of an effluent of industrial origin.

What is claimed is:

1. A process for reducing the COD (chemical oxygen demand) and/or the TOC (total organic carbon) of an aqueous medium comprising organic molecules, comprising subjecting said aqueous medium to irradiation from an electron beam generated by an electron accelerator in the presence of a catalyst and removing precipitates formed in the aqueous medium, said catalyst comprising a metal ion persulfate and an Fe(II) salt or an Fe(III) salt, in a concentration to reduce said COD and/or TOC in said aqueous medium.

2. The process as claimed in claim 1, wherein the persulfate is selected from the group consisting of alkali metal, alkaline earth metal or transition metal persulfates.

3. The process as claimed in claim 2, wherein the persulfate is an alkali metal persulfate.

4. The process as claimed in claim 1, wherein the iron salt is selected from salts in which the anion is inactive in radical reactions.

5. The process as claimed in claim 4, wherein the iron salt is iron perchlorate or iron sulfate.

6. The process as claimed in claim 1, wherein the concentration of iron salt is lower than the concentration of persulfate.

7. The process as claimed in claim 1, wherein the medium to be treated has an acidic pH.

8. The process as claimed in claim 1, wherein the organic molecules are of the aromatic type, of the aliphatic type, or mixtures thereof.

* * * * *